United States Patent
Chu et al.

(10) Patent No.: US 12,520,377 B2
(45) Date of Patent: Jan. 6, 2026

(54) SINGLE LINK MULTI-LINK DEVICE OPERATION

(71) Applicant: NXP USA, Inc., Austin, TX (US)

(72) Inventors: Liwen Chu, San Ramon, CA (US); Hongyuan Zhang, Fremont, CA (US)

(73) Assignee: NXP USA, Inc., Austin, TX (US)

(*) Notice: Subject to any disclaimer, the term of this patent is extended or adjusted under 35 U.S.C. 154(b) by 396 days.

(21) Appl. No.: 18/171,939

(22) Filed: Feb. 21, 2023

(65) Prior Publication Data
US 2023/0269826 A1 Aug. 24, 2023

Related U.S. Application Data

(60) Provisional application No. 63/268,308, filed on Feb. 21, 2022.

(51) Int. Cl.
*H04W 76/34* (2018.01)
*H04W 48/12* (2009.01)
*H04W 52/02* (2009.01)
*H04W 76/15* (2018.01)

(52) U.S. Cl.
CPC .......... *H04W 76/34* (2018.02); *H04W 48/12* (2013.01); *H04W 52/0212* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2022/0337338 A1* | 10/2022 | Homchaudhuri | H04W 52/0254 |
| 2023/0144291 A1* | 5/2023 | Naik | H04W 74/0816 370/329 |
| 2023/0156840 A1* | 5/2023 | Chitrakar | H04W 76/15 370/329 |
| 2023/0164663 A1* | 5/2023 | Chang | H04W 40/12 370/338 |
| 2024/0381466 A1* | 11/2024 | Sevin | H04W 76/15 |

OTHER PUBLICATIONS

IEEE P802.11be/D3.0 Draft Standard for Information technology— Telecommunications and information exchange between systems Local and metropolitan area networks—Specific requirements, Jan. 2020 35.3.17 Enhanced multi-link single radio operation, pp. 563-572.

* cited by examiner

*Primary Examiner* — Hong S Cho

(57) ABSTRACT

A method for exchanging frames between an access point (AP) multi-link device (MLD) and a non-AP MLD, comprising: establishing a plurality of links between the AP MLD and the non-AP MLD wherein the non-AP MLD is in an eMLSR/eMLMR mode; reducing the number of links between the AP MLD and the non-AP MLD to a single link, wherein the non-AP MLD remains in the eMLSR/eMLMR mode.

18 Claims, 2 Drawing Sheets

SINGLE LINK MULTI-LINK DEVICE OPERATION

CROSS-REFERENCE TO RELATED APPLICATIONS

This application claims the benefit of U.S. Provisional Patent Application No. 63/268,308, filed Feb. 21, 2023, which is incorporated, for all purposes, by reference herein in its entirety.

FIELD OF THE DISCLOSURE

Various exemplary embodiments disclosed herein relate to single link multi-link device operation.

SUMMARY

A summary of various exemplary embodiments is presented below.

Various embodiments relate to a method for exchanging frames between an access point (AP) multi-link device (MLD) and a non-AP MLD, including:
establishing a plurality of links between the AP MLD and the non-AP MLD wherein the non-AP MLD is in an eMLSR/eMLMR mode; and reducing the number of links between the AP MLD and the non-AP MLD to a single link, wherein the non-AP MLD remains in the eMLSR/eMLMR mode.

Various embodiments are described, further including: receiving, by the non-AP MLD, a multi-link element without eMLSR/eMLMR capabilities for the single link.

Various embodiments are described, further including: disabling, by the non-AP MLD, the eMLSR/eMLMR mode after receiving the multi-link element without eMLSR/eMLMR capabilities.

Various embodiments are described, further including: receiving, by the non-AP MLD, a beacon frame with a critical update flag indicating whether there are critical updates to operating parameters.

Various embodiments are described, wherein the non-AP MLD does not decode the whole beacon frame when there are not critical changes to the operating parameters.

Various embodiments are described, wherein the non-AP MLD decodes the whole beacon frame when there are not critical changes to the operating parameters.

Various embodiments are described, further including: determining, by the AP MILD, that the non-AP MLD device and any other devices associated with the single link are in an active mode; and transmitting, by the AP MLD, group-addressed frames when they are received.

Various embodiments are described, where in the transmitted group-addressed frames are transmitted on one spatial stream.

Various embodiments are described, further including: transmitting, by the AP MLD, an indication that the AP MLD will not accept a new association request for the single link.

Various embodiments are described, wherein when the non-AP MLD is in an eMLSR mode, preventing the non-AP MLD from enabling a dynamic spatial multiplexing power save mode.

Various embodiments are described, further including: negotiating eMLSR operation of the non-AP MLD on the single link; and disabling a dynamic spatial multiplexing power save mode.

Further various embodiments relate to a method for exchanging frames between an access point (AP) multi-link device (MLD) and a non-AP MLD, including: establishing a plurality of links between the AP MLD and the non-AP MLD; reducing the number of links between the AP MLD and the non-AP MLD to a single link; enabling, by the non-AP MLD, a dynamic spatial multiplexing power save mode; and enabling, by the non-AP MLD, an eMLSR mode for the single link.

Further various embodiments relate to a non-access point (AP) multi-link device (MLD) for exchanging frames between an access point (AP), including: a transmitter; a receiver; a processor connected to the transmitter and the receiver configured to: establish a plurality of links between the AP MLD and the non-AP MLD wherein the non-AP MLD is in an eMLSR/eMLMR mode; and reduce the number of links between the AP MLD and the non-AP MLD to a single link, wherein the non-AP MLD remains in the eMLSR/eMLMR mode.

Various embodiments are described, wherein the processor is further configured to: receive a multi-link element without eMLSR/eMLMR capabilities for the single link.

Various embodiments are described, wherein the processor is further configured to:
disable the eMLSR/eMLMR mode after receiving the multi-link element without eMLSR/eMLMR capabilities.

Various embodiments are described, wherein the processor is further configured to:
receive a beacon frame with a critical update flag indicating whether there are critical updates to operating parameters.

Various embodiments are described, wherein, wherein the non-AP MILD does not decode the whole beacon frame when there are not critical changes to the operating parameters.

Various embodiments are described, wherein the non-AP MILD decodes the whole beacon frame when there are not critical changes to the operating parameters.

Various embodiments are described, wherein the processor is further configured to:
prevent the non-AP MLD from enabling a dynamic spatial multiplexing power save mode when the non-AP MLD is in an eMLSR mode.

Various embodiments are described, wherein the processor is further configured to: negotiate eMLSR operation of the non-AP MLD on the single link; and disable a dynamic spatial multiplexing power save mode.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of WiFi systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
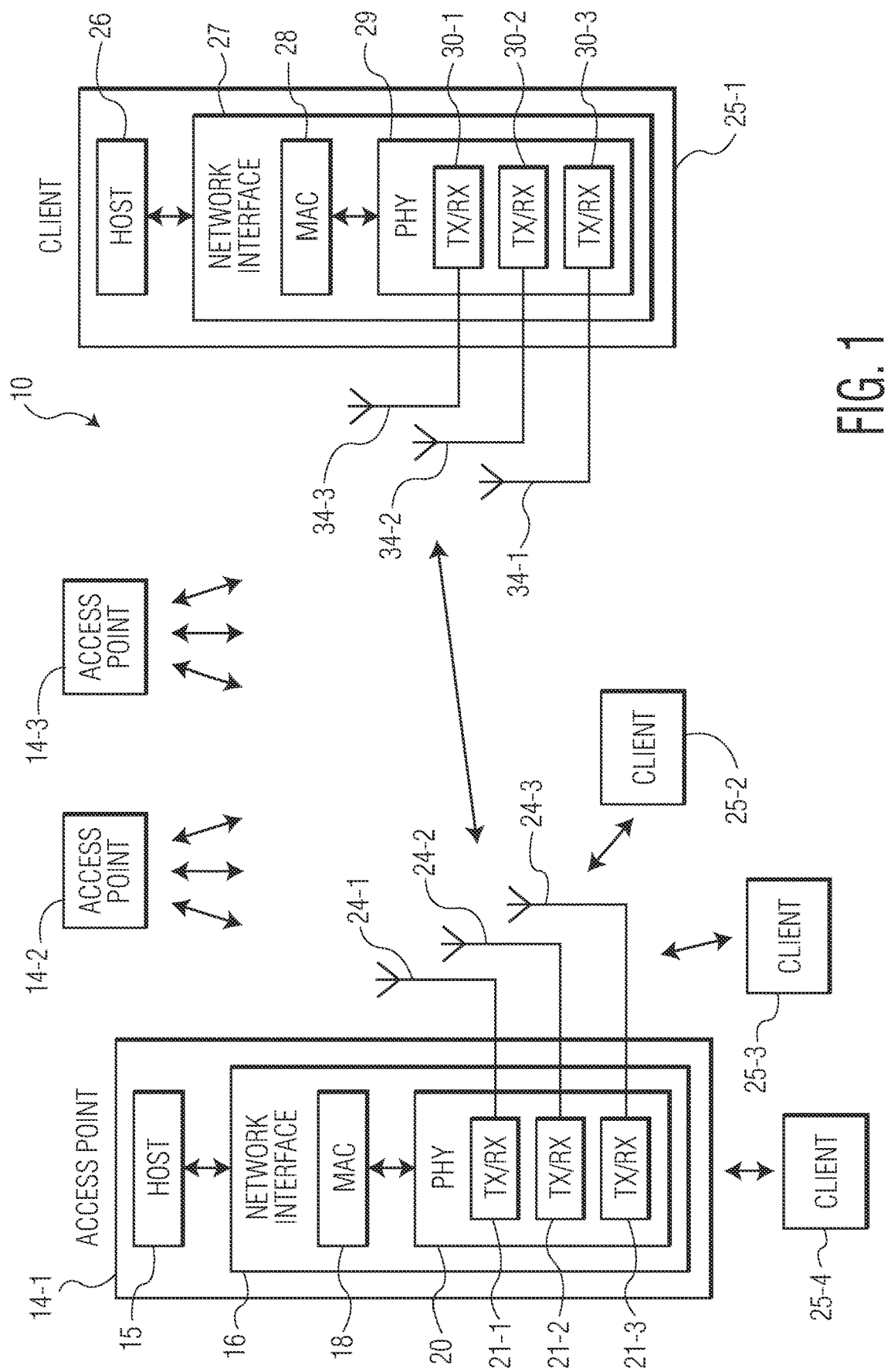
FIG. 1 is a block diagram of an example wireless local area network (WLAN).

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one non-AP MLD includes multiple affiliated STAs. Two or more of the STAs of a non-AP MLD 25 are configured to receive corresponding data streams that are transmitted simultaneously by the AP 14. Additionally, two or more of the STAs of a non-AP MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of a non-AP MLD 25 may transmit data streams simultaneously to the multiple APs of an AP MLD 14. MLD devices and operation will be described in more detail below.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an orthogonal frequency division multiple access (OFDMA) resource unit (RU) that includes the different OFDM RUs modulated in respective sub-channel blocks of the OFDMA RU. In an embodiment, the AP 14 allocates different sub-channels to different client stations and forms the OFDMA RU that includes OFDM RUs directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM RUs via different space time streams of a MU-MIMO communication channel to a single user (SU) or multiple users. In an embodiment, the APs 14 allocates different sub-channels and space time streams to different client stations and forms the OFDM RUs and modulates the different OFDM RUs to the space time streams corresponding to the sub-channels assigned to the client stations.

Various iterations of the 802.11 specification are referred to herein. IEEE 802.11ac is referred to as very high throughput (VHT). IEEE 802.1 lax is referred to as high efficiency (HE). IEEE 802.11be is referred to as extreme high throughput (EHT). The terms VHT, HE, and EHT will be used in the descriptions found herein.

As described above a multi-link AP MLD has multiple links where each link has one AP affiliated with the AP MLD. This may be accomplished by having two different radios.

A multi-link STA MLD has one or multiple links where each link has one AP affiliated with the AP MLD. One way to implement the multi-link STA MLD is using two or more radios, where each radio is associated with a specific link. For example, an enhanced multi-link multi-radio (eMLMR) non-AP MLD may be used. The eMLMR non-AP MLD uses multiple full functional radios to monitor the medium in multiple links. Another way to implement the multi-link STA MLD is using a single radio in two different bands. Each band may be associated with a specific link. In this case only one link is available at a time. In yet another implementation, an enhanced single-radio (ESR) STA MLD may be used that operates in an enhanced multi-link single radio (eMLSR) mode. The ESR STA MLD uses two radios in different bands to implement the STA. For example, one radio may be a lower cost radio with lesser capabilities and the other radio may be a fully functional radio supporting the latest protocols. The ESR STA MLD may dynamically switch its working link while it can only transmit or receive through one link at any time. The ESR STA MLD may monitor two links simultaneously, for example, detecting medium idle/busy status of each link, or receiving a PPDU on each link. Each radio may have its own backoff time, and when the backoff counter for one of the radios becomes zero that radio and link may be used for transmission. For example, if an AP wants to use the fully functional radio, it may send a control frame that is long enough for the ESR STA MLD to switch from the lesser capable radio to the fully functional radio that may then transmit data to the AP.

In embodiments of a wireless communications system, a wireless device, e.g., an AP MLD of the WLAN may transmit data to at least one associated STA MILD. The AP MLD may be configured to operate with associated STA MLDs according to a communication protocol. For example, the communication protocol may be an Extremely High Throughput (EHT) communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a BSS with the AP, but are generally affiliated with lower data throughput protocols. The lower data throughput communication protocols (e.g., HE, VHT, etc.) may be collectively referred to herein as "legacy" communication protocols.

An AP MLD in multi-link operation may remove its links through MLD reconfiguration. Multi-link (ML) reconfiguration broadly refers to a set of post-association procedures to make changes to links between APs and non-AP STAs affiliated with two MLDs including adding or removing links, and without disassociation. This may be accomplished using the reconfiguration multi-link element in a beacon frame. As a result, the AP MLD may have only one link after link removal. Also, a mobile AP MLD may only have one link because often these devices are power constrained, and the use of only a single link saves power. If an AP MLD with multiple links and a non-AP MLD with multiple links have one common link, they may do association through the common link. When links are removed, how the MLD operates with the single link is ambiguous under the current standards and should be clarified, e.g. whether the BSS Parameter Change Count and Critical Update Flag are mandatory requirement at the single-link non-AP MLD, whether the EMLSR mode is still used at non-AP MLD, and whether the radio switch padding delay is still needed for the first control frame addressed to an EMLSR non-AP MLD.

Figure 2:
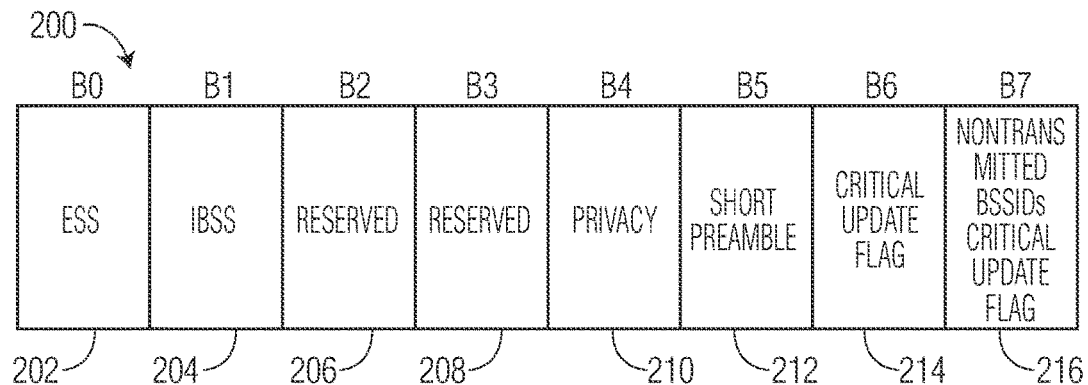
FIG. 2 illustrates the first byte of the capability information field format found in the beacon frame.

FIG. 2 illustrates the first byte of the capability information field format found in the beacon frame. The capability information filed format 200 includes the following bit fields: Extended Service Set (ESS) 202; Independent Basic Service Set (IBSS) 204; reserved 206 and 208; privacy 210; short preamble 212; critical update flag 214; and nontransmitted BSSIDs critical update flag 216. The critical update flag 214 and nontransmitted BSSID critical update flag 216 are useful for STA's power save, i.e., the STA stops the decoding of the beacon frame if no critical update happens at the AP MLD as indicated by the critical update flag 214 and nontransmitted BSSID critical update flag 216. In one aspect, support of the critical update flag 214 and the nontransmitted BSSID critical update flag is mandatory at the AP MLD.

Figure 3A:
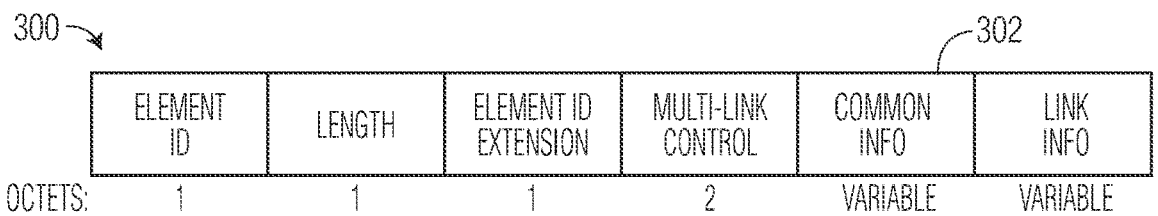
FIG. 3A illustrates the multi-link element format.
Figure 3B:
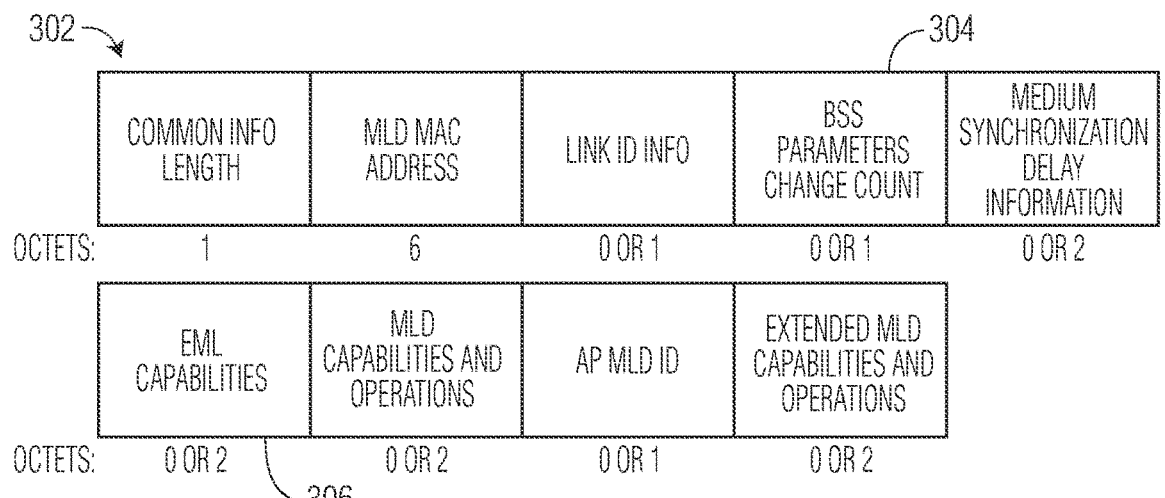
FIG. 3B illustrates the common info field format.

Each time an AP MLD makes a critical update to BSS parameters, a BSS parameter change count is incremented. A non-AP STA linked to the AP MLD will keep track of the BSS parameter change counter. When the non-AP STA sees that the BSS parameter change count has changed, it will indicate that the AP MLD has made critical changes to the operating parameters of the link. FIG. 3A illustrates the multi-link element format. The multi-link element 300 includes a common info field 302. FIG. 3B illustrates the common info field 302 format. The common info field 302 includes the BSS parameters change count field 304. It noted that monitoring the BSS parameter change count does not help with power savings of single-link non-AP MLD because it is at the end of the Beacon frame, which means the whole beacon frame needs to be decoded. In one aspect, support of the BSS parameter change count is optional. The AP may set the BSS parameter change count to 255 to indicate the value is not known or that the value should be ignored. Further, the recipient non-AP MLD may ignore the received BSS parameter change count.

In one aspect, the critical update flag 214 and nontransmitted BSSID critical update flag 216 are useful for a STA's power save mode, i.e., the STA may stop further decoding of the Beacon if no critical update happens at AP MLD as indicated by update flag(s) such as either the critical update flag 214 and nontransmitted BSSID critical update flag 216. However the non-AP MLD may ignore the indication and decode the whole beacon frame. The support of the critical update flag 214 and nontransmitted BSSID critical update flag 216 is optional at the non-AP MLD with a single enabled link.

Therefore, a non-AP MLD with single enabled link may operate as follows: if either the critical update flag 214 when the non-AP MLD is associated with the AP MLD with which the transmitted BSSID AP is affiliated or nontransmitted BSSID critical update flag 216 when the non-AP MLD is associated with the AP MLD with which the nontransmitted BSSID AP is affiliated indicates a change in critical operation parameters, then non-AP MLD will decode the whole beacon frame. If the critical update flag 214 indicates a change in critical operation parameters, then the non-AP MLD associated with the AP MLD with which the transmitted BSSID AP is affiliated will not decode the whole beacon frame. If and nontransmitted BSSID critical update flag 216 indicates a change in critical operation parameters, then the non-AP MLD associated with the AP MLD with which the nontransmitted BSSID AP is affiliated will not decode the whole beacon frame.

Various aspects of eMLSR/eMLMR operation when there is a single link will now be described. In a first aspect, when an AP MLD has only one link left and there are non-AP MLDs in eMLSR/eMLMR mode, the non-AP MLD automatically disables eMLSR/eMLMR mode. Because there is only one link, there will not be a need to dynamically switch between links to accommodate data traffic. As a result there is no need for eMLSR/eMLMR operation and hence eMLSR/eMLMR operation may be disabled.

Figure 3C:
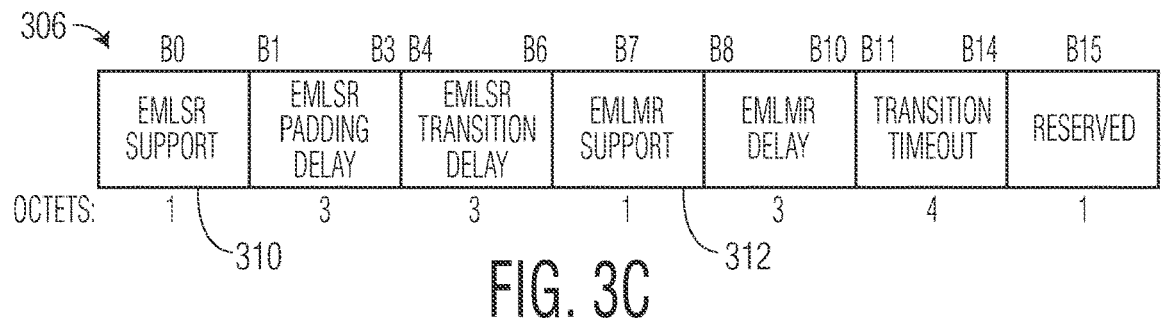
FIG. 3C illustrates the enhanced multi-link capabilities subfield format.

In a second aspect, an eMLSR/eMLMR non-AP MLD with one remaining link associated with an AP MLD with the remaining single link may remain in the eMLSR/eMLMR mode. When an AP MLD that supports eMLSR/eMLMR has only link left and there are non-AP MLDs in eMLSR/eMLMR mode, the AP MLD may announce a ML element 300 without eMLSR/eMLMR related capabilities. FIG. 3C illustrates the enhanced multi-link capabilities subfield 306 format. The multi-link capabilities subfield 306 includes an EMLSR support bit 310 and EMLMR support bit 312 that indicate whether eMLSR or eMLMR, respectively, are enabled for the link. Then the non-AP MLDs in eMLSR/eMLMR mode disable the eMLSR/eMLMR mode after receiving the ML element 300 without eMLSR/eMLMR related capabilities. Therefore, when the AP MLD reduces the number of links to one, the associated non-AP MLDs in eMLSR/eMLMR mode remain in that mode unless explicitly commanded to disable the eMLSR/eMLMR mode via a beacon frame with an ML element 300 without eMLSR/eMLMR capabilities.

In a third aspect, when an AP MLD has only one remaining link and there are non-AP MLDs in eMLSR/eMLMR mode, the non-AP MLD remain in the eMLSR/eMLMR mode. This is like the second aspect above, but because the radio switch is not needed, the initial control frame does not need the special padding for radio switch. The special padding field provides a time to allow for the radio switch to be activated. It is carried in a trigger frame and is an optional field. Because there is only one link, there is no need to switch to another radio, therefore the optional special padding field is not sent.

Next, how dynamic spatial multiplexed (SM) power save mode is handled for eMLSR/eMLMR mode when there is a reduction to a single link. Currently, it is not clear whether a non-AP MLD in eMLSR mode enables its dynamic SM power save in any link that is in eMLSR mode.

The rules of switching back to monitor multiple links and the rules of finishing dynamic frame exchanges are similar to the existing rules but have some differences. In one embodiment, a non-AP MLD with a link whose dynamic SM power save mode is enabled can then enable its eMLSR/eMLMR mode that covers the link. The eMLSR/eMLMR frame exchange rules are followed. In another embodiment, a variant to this approach is that the dynamic SM power save in a link is automatically disabled when the negotiated eMLSR/eMLMR includes the link.

In another aspect, if all eMLSR/eMLMR MLDs associated with the AP MLD have one link left and are in active mode (i.e., they are in power save mode) and if the other associated STAs with the AP in the link are in active mode (i.e., they are in power save mode), the AP may use the single link to transmit group-addressed frames at any time. As data comes into the AP there is no need to buffer the group-addressed frames to await a beacon from a STA in power save mode. Another restriction may include that the PHY protocol data unit (PPDU) that carries group-addressed frames will be use one spatial stream (SS).

In another aspect, during the association process, an association request may include a link recommendation, and it is possible that an AP MILD does not want to accept an additional non-AP MLD that includes a request for a specific link. For example, when the link is used for low latency traffic and the non-AP MLD sends Association Request does not support rTWT the AP MLD may not want to accept that association request.

This may be addressed by the AP MLD indicating in the Beacon-(ML) Probe Response whether an AP of the AP MLD in the link is recommended to receive an association request. The ML element 300 or reduced neighbor reports (RNR) carries the information whether an AP of the AP MLD in a link is recommended to receive Association Request. An AP MLD indicates whether an AP of the AP MLD in a link does not want to receive an association request. The ML element 300 or RNR carries the information whether an AP of the AP MLD in a link does not want to receive Association Request.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method for exchanging frames between an access point (AP) multi-link device (MLD) and a non-AP MLD, comprising:
establishing a plurality of links between the AP MLD and the non-AP MLD wherein the non-AP MLD is in an eMLSR/eMLMR mode; and
reducing the number of links between the AP MLD and the non-AP MLD to a single link, wherein the non-AP MLD remains in the eMLSR/eMLMR mode; and wherein when the non-AP MLD is in an eMLSR mode, preventing the non-AP MLD from enabling a dynamic spatial multiplexing power save mode.

2. The method of claim 1, further comprising:
receiving, by the non-AP MLD, a multi-link element without eMLSR/eMLMR capabilities for the single link.

3. The method of claim 2, further comprising:
disabling, by the non-AP MLD, the eMLSR/eMLMR mode after receiving the multi-link element without eMLSR/eMLMR capabilities.

4. The method of claim 1, further comprising:
receiving, by the non-AP MLD, a beacon frame with a critical update flag indicating whether there are critical updates to operating parameters.

5. The method of claim 4, wherein the non-AP MLD does not decode the whole beacon frame when there are not critical changes to the operating parameters.

6. The method of claim 4, wherein the non-AP MLD decodes the whole beacon frame when there are not critical changes to the operating parameters.

7. The method of claim 1, further comprising:
determining, by the AP MLD, that the non-AP MLD device and any other devices associated with the single link are in an active mode; and
transmitting, by the AP MLD, group-addressed frames when they are received.

8. The method of claim 1, where in the transmitted group-addressed frames are transmitted on one spatial stream.

9. The method of claim 1, further comprising:
transmitting, by the AP MLD, an indication that the AP MLD will not accept a new association request for the single link.

10. The method of claim 1, further comprising:
negotiating eMLSR operation of the non-AP MLD on the single link; and
disabling the dynamic spatial multiplexing power save mode.

11. A method for exchanging frames between an access point (AP) multi-link device (MLD) and a non-AP MLD, comprising:
establishing a plurality of links between the AP MLD and the non-AP MLD;
reducing the number of links between the AP MLD and the non-AP MLD to a single link;
enabling, by the non-AP MLD, a dynamic spatial multiplexing power save mode; and
enabling, by the non-AP MLD, an eMLSR mode for the single link; and
transmitting, by the AP MLD, an indication that the AP MLD will not accept a new association request for the single link.

12. A non-access point (AP) multi-link device (MLD) for exchanging frames between an access point (AP), comprising:
a transmitter;
a receiver;
a processor connected to the transmitter and the receiver configured to:
establish a plurality of links between the AP MLD and the non-AP MLD wherein the non-AP MLD is in an eMLSR/eMLMR mode; and
reduce the number of links between the AP MLD and the non-AP MLD to a single link, wherein the non-AP MLD remains in the eMLSR/eMLMR mode; wherein the processor is further configured to:
prevent the non-AP MLD from enabling a dynamic spatial multiplexing power save mode when the non-AP MLD is in an eMLSR mode.

13. The non-AP MLD of claim 12, wherein the processor is further configured to:
receive a multi-link element without eMLSR/eMLMR capabilities for the single link.

14. The non-AP MLD of claim 13, wherein the processor is further configured to:
disable the eMLSR/eMLMR mode after receiving the multi-link element without eMLSR/eMLMR capabilities.

15. The non-AP MLD of claim 12, wherein the processor is further configured to:
   receive a beacon frame with a critical update flag indicating whether there are critical updates to operating parameters.

16. The non-AP MLD of claim 15, wherein, wherein the non-AP MLD does not decode the whole beacon frame when there are not critical changes to the operating parameters.

17. The non-AP MLD of claim 15, wherein the non-AP MLD decodes the whole beacon frame when there are not critical changes to the operating parameters.

18. The non-AP MLD of claim 12, wherein the processor is further configured to:
   negotiate eMLSR operation of the non-AP MLD on the single link; and
   disable the dynamic spatial multiplexing power save mode.

* * * * *